United States Patent
Lee et al.

(10) Patent No.: US 7,064,910 B2
(45) Date of Patent: Jun. 20, 2006

(54) PROJECTION LENS MOVEMENT-ADJUSTING APPARATUS

(75) Inventors: Chia-Chang Lee, Hsinchu (TW); Wan-Chiang Wang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 156 days.

(21) Appl. No.: 10/930,761

(22) Filed: Sep. 1, 2004

(65) Prior Publication Data

US 2005/0052627 A1    Mar. 10, 2005

(30) Foreign Application Priority Data

Sep. 10, 2003    (TW) .............................. 92216456 U

(51) Int. Cl.
    *G02B 7/02*    (2006.01)
(52) U.S. Cl. ....................... 359/819; 359/811; 359/822
(58) Field of Classification Search ................ 359/819, 359/811, 822, 823, 813, 814, 812, 826, 829
    See application file for complete search history.

(56) References Cited

U.S. PATENT DOCUMENTS 5,895,110 A    4/1999    Okada et al.

*Primary Examiner*—Timothy Thompson
(74) *Attorney, Agent, or Firm*—Bacon & Thomas

(57) ABSTRACT

A projection lens movement-adjusting apparatus comprises an adjusting module and a projection lens module. The adjusting module comprises a fixed support, an adjusting rod, a sliding seat and a fixing portion. The adjusting rod is pivoted to the fixed support. The sliding seat is mounted inside the fixed support and screwed to the adjusting rod. A fixing portion is disposed on one side of the sliding seat. The projection lens module is composed of projection lens and the linking unit fixed to one side of the projection lens, and a protruding board is on one side of the linking unit and is fixed firmly to the fixing unit and hence the projection lens module can be connected with the sliding seat.

6 Claims, 4 Drawing Sheets

PROJECTION LENS MOVEMENT-ADJUSTING APPARATUS

FIELD OF THE INVENTION

The present invention relates to an adjusting apparatus, and more particularly to a projection lens movement-adjusting apparatus applied in a projector display apparatus.

BACKGROUND OF THE INVENTION

Please refer to FIG. 1, which is a lens adjusting apparatus 10 disclosed in U.S. Pat. No. 5,895,110. A fixed board 12 is disposed perpendicular to a base 11 to form a L-shape. Then a U-type supporting plate 13 is disposed on the fixed board 12, and the U-type supporting plate 13 faces upward with gaps on both sides between the-U type supporting plate and the fixed board 12 in order to form a sliding groove 131. There is a hinge 14 disposed on one upper corner of the fixed board 12. Then a projection lens module 16 is equipped on one end of the sliding unit 15 that has a screw nut 17 firmly matched to the hinge 14. The sliding unit 15 is inserted into a sliding groove 131 from the opening of the supporting unit 13, and the adjusting rod 18 passes through the hinge 14 and is screwed to the screw nut 17. When the adjusting rod 18 is rotated, the screw nut 17 pushes forward the projection lens to shift up and down along the adjusting rod 18.

As commonly known, the following process makes up a conventional adjusting apparatus 10. By using either the punching or the casting way, the base 11, the fixed unit 12 and the supporting unit 131 can be one body for the first assembly component. The sliding unit 15, the projection lens set 16 and the screw nut 171 can be one body for the second assembly component. And then these two components can be assembled as the adjusting apparatus 10 through the adjusting rod 10. However, when we install the second assembly component into the opening of the supporting unit 13, the hinge 14 will stop it and cause the difficulties of assembly. In addition, by considering the manufacturing deviation of the hinge and screw nut, and the assembly deviation of the sliding unit and the supporting unit, there will be much difficulties when assemble the adjusting rod and then the adjusting rod is not able to be parallel to the z-axis and then causes the obliquely movement of the projection lens set. Therefore, in order to guarantee that the adjusting rod is accurately established, we must enhance the processing and assembly precision that will increase the processing cost.

Moreover, because the adjusting apparatus 10 is assembled with the projection lens set 16, when the adjusting unit 10 is damaged and must be repaired or replaced, the whole set of adjusting apparatus 10 with projection lens set 16 have to be replaced together. This will cause either the waste of the projection lens set 16 or the waste of time to dismount the projection lens set 16 and then replace the other adjusting components. However, the projection lens set 16 is the extremely precise optical part and it will be easily damaged in the disassembly process. Therefore, the conventional adjusting apparatus has a problem that it is inconvenient to repair.

SUMMARY OF THE INVENTION

One object of the present invention is to provide a projection lens movement-adjusting apparatus, which takes the advantage of fixing unit to assemble the adjusting module and the projection lens module. This will minimize the assembly and production deviation, without enhancing the processing precision, and also guarantees the precision of the adjusting rod.

Another object of the present invention is to provide a projection lens movement-adjusting apparatus, which takes the advantage of a separated adjusting module and a separated projection lens module to be assembled faster and be repaired more conveniently.

Still another object of the present invention is to provide a projection lens movement-adjusting apparatus by using the installment of a spring to push the projection lens module to one side for positioning, so as to avoid position shifting when the adjusting module pushes forward the projection lens module.

In order to achieve the objectives mentioned above, the projection lens movement-adjusting apparatus according to the present invention includes an adjusting module and a projection lens module. The adjusting module comprises a fixed support, an adjusting rod, a sliding seat and a fixing portion. The adjusting rod is pivoted to the fixed support. The sliding seat is mounted inside the fixed support and screwed to the adjusting rod. There is a fixing portion disposed on one side of the sliding seat. The projection lens module is composed of projection lens and the linking unit fixed to one side of the projection lens, and there is a protruding board designed on one side of the linking unit for being fixed firmly to the fixing unit and hence the projection lens module can be connected with the sliding seat. Therefore, we can fulfill the demand of fast assembly, convenience for repairing and avoid the assembly deviation that influences the accuracy of the adjusting rod. On the other way, by rolling the adjusting rod the sliding seat will be pushed forward, and then the sliding seat will push forward the projection lens module to make a linear movement.

BRIFE DESCRIPTION OF THE DRAWINGS

DETAILED DESCRIPTION OF THE PREFERRED EMBODIMENT

Figure 1:
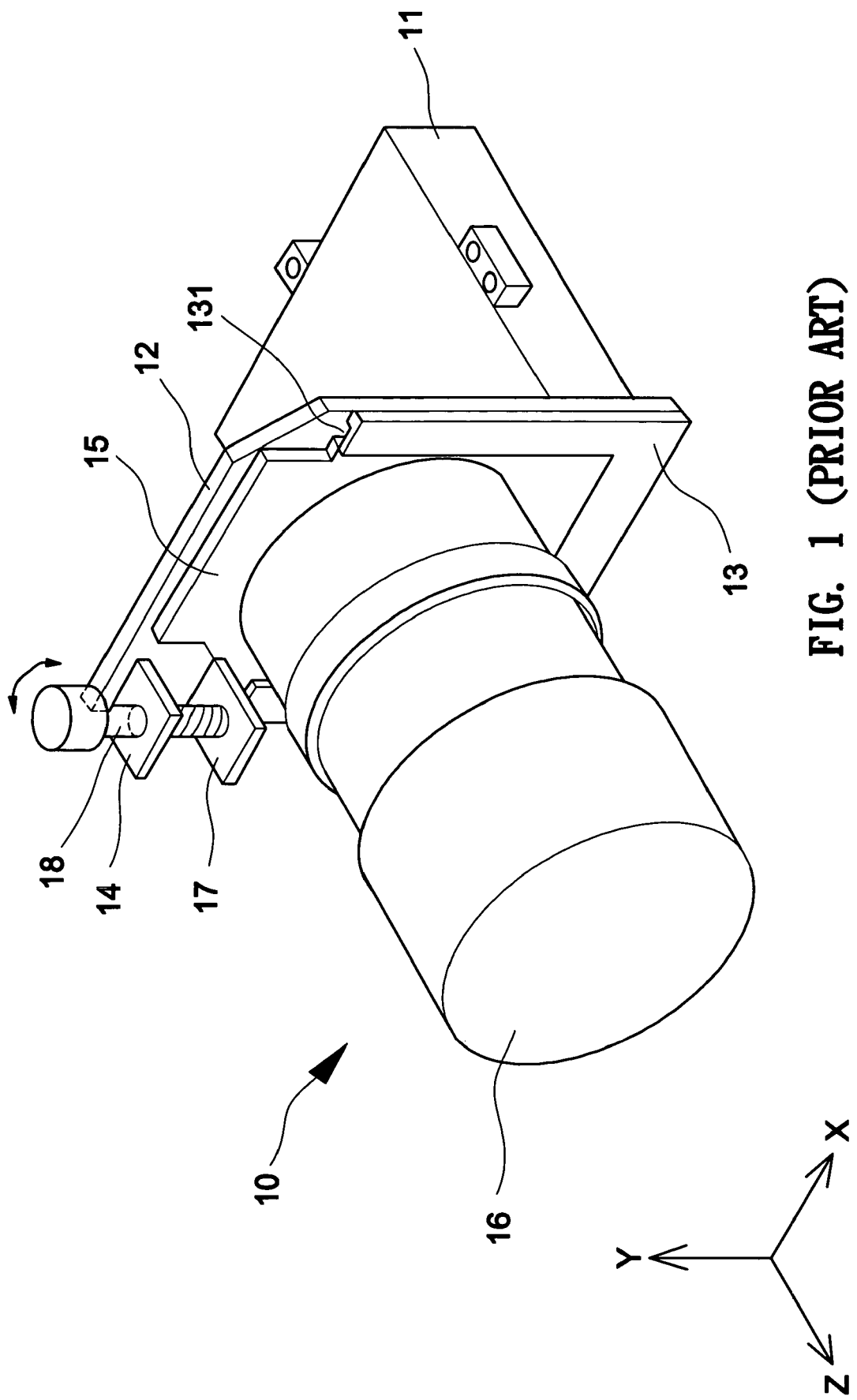
FIG. 1 is the perspective view of the conventional projection lens movement-adjusting apparatus.
Figure 2:
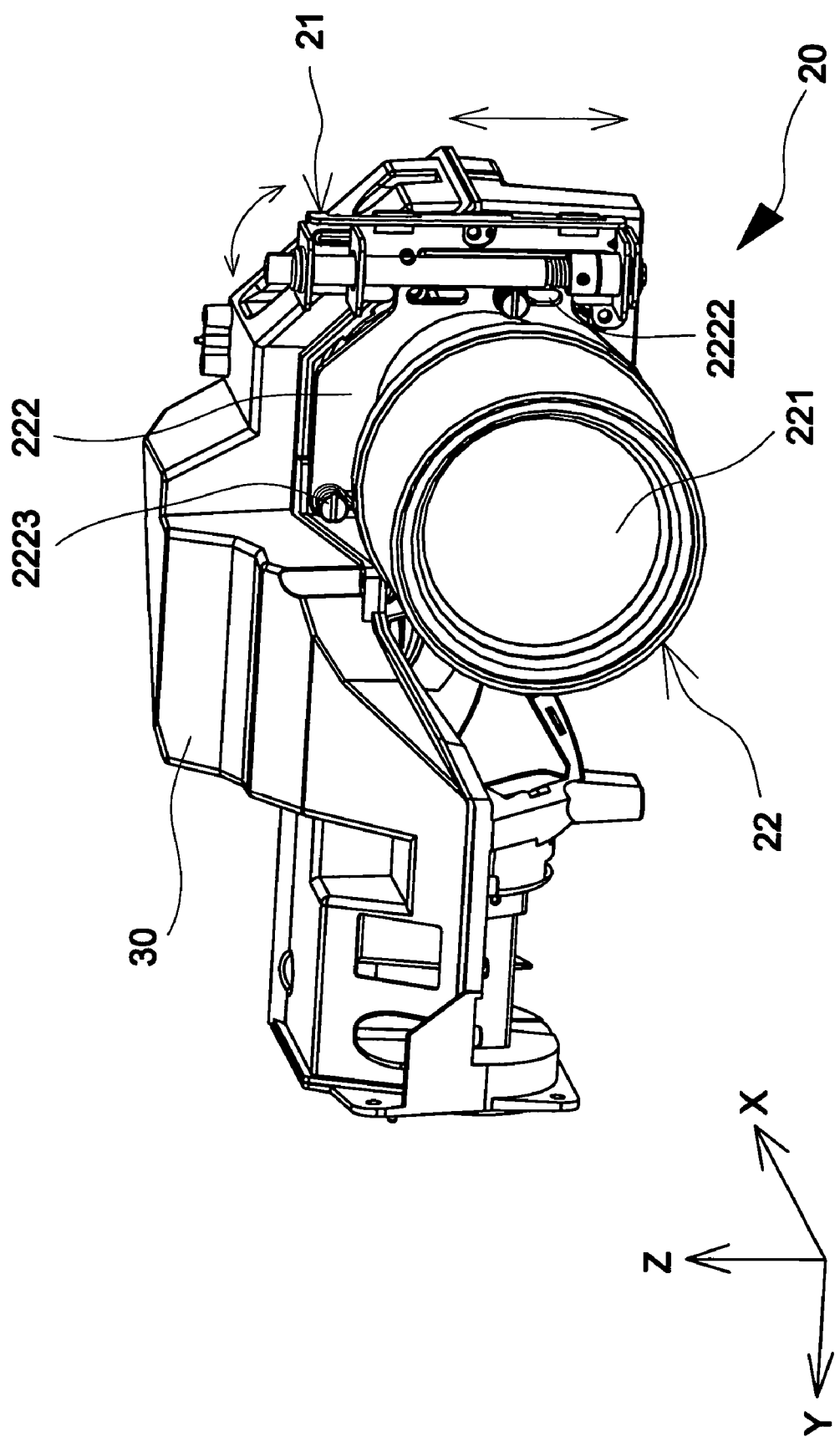
FIG. 2 is the perspective view of the projection lens movement-adjusting apparatus according to the present invention.

Please refer to FIG. 2. The projection lens movement-adjusting apparatus 20 according to the present invention is composed of an adjusting module 21 and a projection lens module 22. The projection lens module 22 is fixed on the adjusting module 21 by linking unit 222, and by rolling the adjusting module 21 the projection lens module 22 will be pushed forward to make a linear movement.

Figure 3:
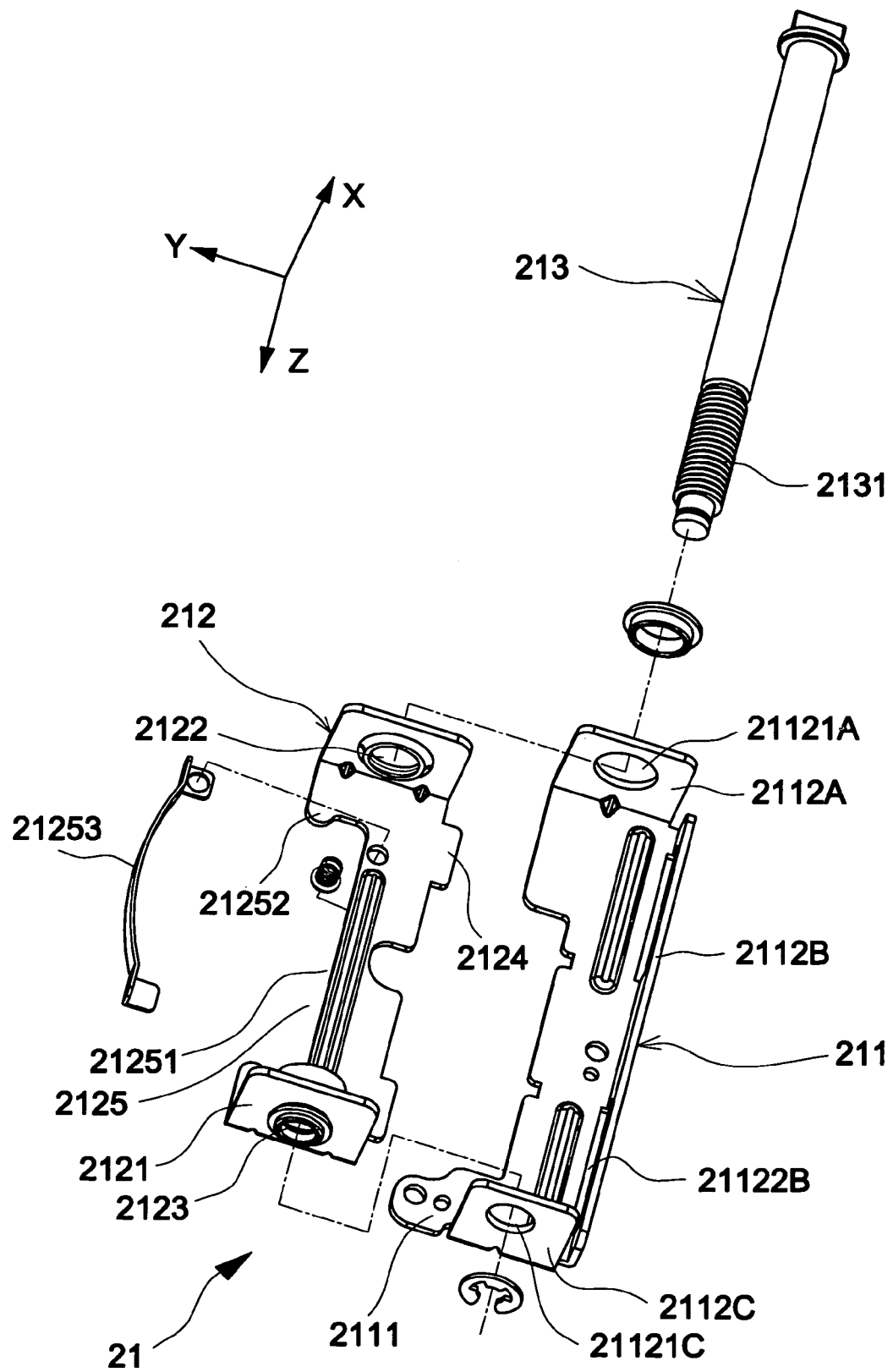
FIG. 3 is the exploded view of the adjusting module according to the present invention.

Please refer to FIG. 3. The adjusting module 21 is composed of a fixed support 211, a sliding seat 212 and an adjusting rod 213. The fixed support 211 is composed of a base 2111 and three adjacent sideboards 2112A, 2112B and 2112C disposed perpendicular to the base 2111. There are through holes 21121A, 21121C disposed on the opposite sideboards 2112A and 211C. The axial center of the through hole 21121A and 21121C are parallel to the z-axis. There is a groove 21122B parallel to the z-axis disposed on the other sideboard 2112B. The sliding seat 212 is mounted inside the fixed support 211 and the sliding seat 212 has a U-type substance 2121. Corresponding to the two through hole 21121A and 21121C of the fixed support 211, one through hole 2122 and one screw hole 2123 are disposed on the U-type substance 2121. Corresponding to guide 21122B, there is a guiding board 2124 on one side of the U-type substance 2121. The guiding board 2124 is plugged into groove 21122B in order to guide the sliding seat 212 to slide along the z-axis corresponding to the base 211. There is one fixing unit 2125 disposed on one side of the U-type substance 2121 corresponding to the guiding board 2124. The fixing unit 2125 is composed of a gap 21251 disposed on one side of the U-type substance and a pair of protruding unit 21252 disposed on both sides of the opening of the gap 21251. There is an arc-type spring 21253 disposed on the bottom of the gap 21251, and the spring 21253 will deform along the y-axis when under a pressure and the spring 21253 is screwed firmly on the U-type substance 2121 by a screw bolt.

In addition, the adjusting rod 213 is equipped with a thread section 2131 on one side. After inserting the protruding unit 21252 of the sliding seat 212 into the groove 21122B of the fixed support 211, the adjusting rod 213 is inserted into the through hole 21121A and 2111. The thread section 2131 is screwed on the screw hole 2123. Then the two sides of the adjusting rod 213 are pivoted on the base 211 in order to form the adjusting module.

Figure 4:
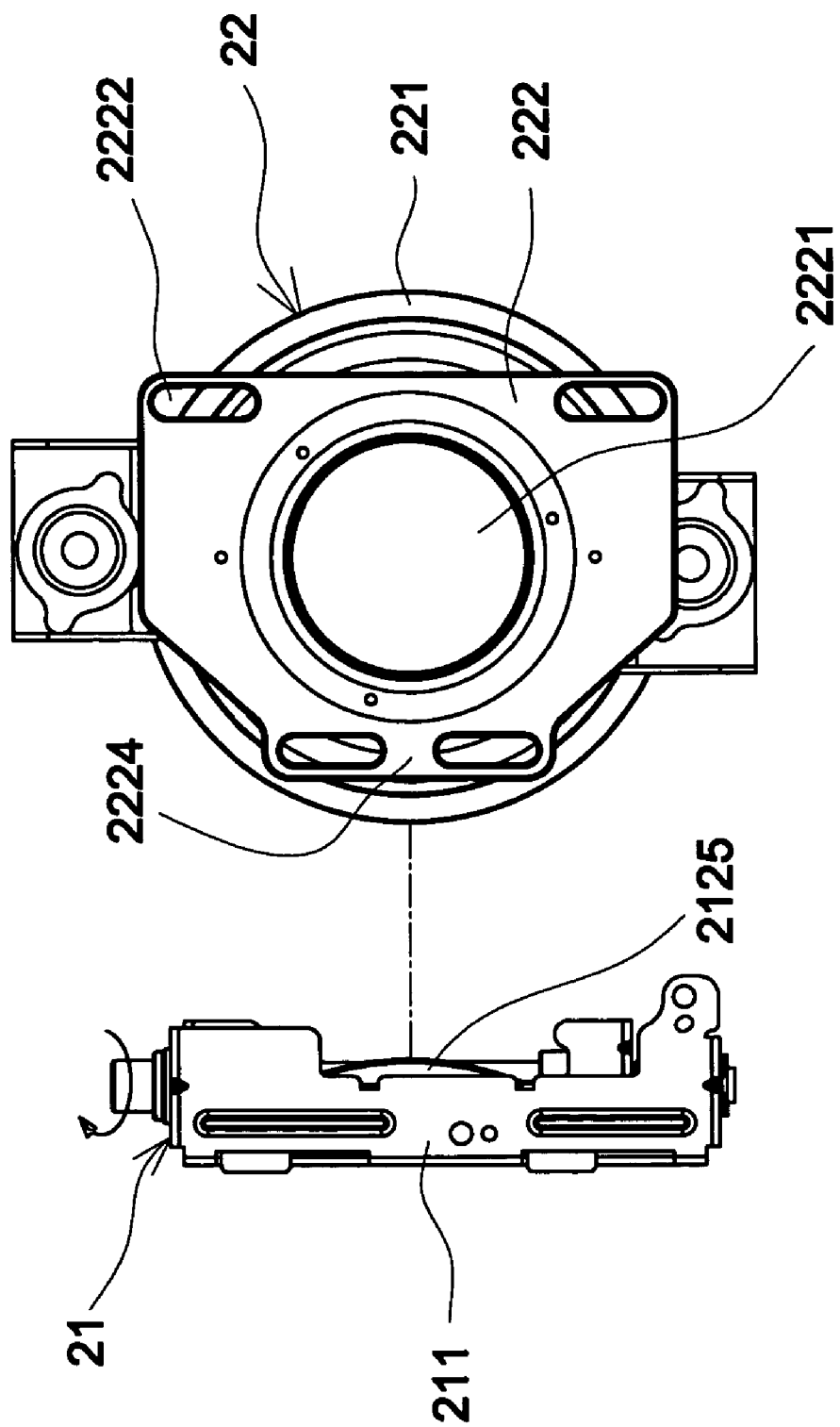
FIG. 4 is the rear view of the decomposed projection lens movement-adjusting apparatus according to the present invention.

Please again refer to FIG. 2 and FIG. 4. FIG. 4 is the rear view of the projection lens module 22. The projection lens module 22 is composed of a projection lens 221 and a linking unit 222. The linking unit 222 is screwed firmly on the rear outer circle of the projection lens 221. There is a central hole 2221 and a plurality of z-axial groove 2222 on the linking unit 222, and it is equipped with a plurality of guiding part 2223 to pass through the groove 2222 and to remain some gap in order to guide the projection lens module 22 to be able to move along the groove. Also, the gap can absorb the assembly deviation of the adjusting module 21 and the projection lens module 22. There is a protruding board 2224 extended from one side of the linking unit 222 that the protruding unit 21252 is able to push against the sides of the protruding board 2224.

The assembly procedure of the present invention is, after fixing the adjusting module 21 to a substance of the projector 30, the protruding board 2224 of the projection lens module 22 is set between one pair of the protruding unit 21252. Then a plurality of guiding part 2223 perpendicularly passes through the groove 2222 and are fixed firmly to a substance of the projector 30 which causes the assembly of the adjusting module 21 and the projection lens module 22. Simultaneously the spring 21253 is set against one side of the protruding unit 2224 in order to limit the y-axis motion of the adjusting module 21. Following the above procedure the projection lens movement-adjusting apparatus 20 according to the present invention can be assembled. On the other end, the projection lens module 22 can also be assembled on the main body of the projector first, and then the adjusting module 21.

The following is the operation of the projection lens movement-adjusting apparatus: When rotating the adjusting rod 213, it will cause the thread section 2131 on the above thereof to push forward the sliding seat 212 along the z-axis by the spirals hole 2123. Simultaneously, the protruding unit 21252 of the fixing portion 2125 of the sliding seat 212 will push forward one side of the protruding board 2224 of the projection lens module 22 in order to leads the projection lens 221 move along the z-axis.

The projection lens module 22 may be limited on its x-axial motion by the guiding part screwed along the x-axis. Also the spring 21253 is disposed on the bottom of the fixing unit 2125 to pull over the projection lens module over one side for positioning, but this will cause the limitation on the y-axial motion of the projection lens module 22. Therefore, when the adjusting rod 213 actuates the projection lens module 22, we can guarantee that the projection lens module 22 moves along the z-axis and there will be no deflective movement on that.

On the other end, the present invention is to separate the adjusting mechanism and the projection lens into two independent modules, the adjusting module 21 and the projection lens module 22. By the process of loading the protruding board of the linking unit 222 into the fixing unit 2125, the linking unit 222 is fixed firmly in order to accomplish the assembly easily. When the adjusting module 21 needs to be repaired or be replaced, it only needs to take out the screw bolt on the adjusting module 21 and the adjusting module can be taken out from the projection lens module 22. The adjusting module 21 can be assembled again after replacing or repairing the related items. Therefore, it will achieve the convenient service and avoid the damage or the loss of the projection lens.

Because the present invention provides the adjusting mechanism (i.e. the fixed support 211, the sliding seat 212, the adjusting rod 213 and so on) to make an adjusting module 21, and then takes the advance of the fixing unit 2125 to make it linked to the projection lens module 22 that has the projection lens 221. The production and assembly deviation will be absorbed by the fixing unit 2125 which will solve the conventional problem that if the adjusting unit is linked by the adjusting rod, there will be production and assembly deviation among all components that will cause the difficult assembly of the adjusting rod and that the adjusting rod can not be disposed parallel to the z-axis. But the objective is achieved that the assembly is easy and the processing precision does not have to be enhanced.

Although the invention has been described in detail herein with reference to its preferred embodiment, it is to be understood that this description is by way of example only, and is not to be interpreted in a limiting sense. It is to be further understood that numerous changes in the details of the embodiments of the invention, and additional embodiments of the invention, will be apparent, and may be made by, persons of ordinary skill in the art having reference to this description. It is considered that such changes and additional embodiments are within the spirit and true scope of the invention as claimed below.

What is claimed is:

1. A projection lens movement-adjusting apparatus, comprising:
   an adjusting module comprising a fixed support, a sliding seat disposed in the fixed support, an adjusting rod being pivoted to the fixed support and screwed to the sliding seat, and the sliding seat will be pushed forward relative to the fixed support by rolling the adjusting rod, and a fixing unit being disposed on one side of the sliding seat; and
   a projection lens module, being linked to the fixing unit of the adjusting module.

2. The projection lens movement-adjusting apparatus according to claim 1, wherein the projection lens module comprises a projection lens and a linking unit, and the linking unit is disposed on one side of the projection lens.

3. The projection lens movement-adjusting apparatus according to claim 1, wherein the fixing unit comprises a gap, two opposite protruding units being disposed on an opening of the gap, a protruding unit being disposed on one side of the linking unit corresponding to the protruding unit.

4. The projection lens movement-adjusting apparatus according to claim 3, wherein an arc-type spring is disposed on the bottom of the gap.

5. The projection lens movement-adjusting apparatus according to claim 1, wherein a groove and a corresponding guiding part are disposed on the fixed support and the sliding seat.

6. The projection lens movement-adjusting apparatus according to claim 1, wherein a groove is disposed on the linking unit.

* * * * *